April 5, 1966   G. M. HERTERICK ET AL   3,244,852
PROCESS FOR MAKING ELECTRIC DISCHARGE MACHINING ELECTRODE
Filed Jan. 6, 1964   3 Sheets-Sheet 1

GEORGE M. HERTERICK
JOHN DAVID PETERSON
INVENTORS

BY Alden D Redfield
Abraham Ogman
ATTORNEYS

April 5, 1966   G. M. HERTERICK ETAL   3,244,852
PROCESS FOR MAKING ELECTRIC DISCHARGE MACHINING ELECTRODE
Filed Jan. 6, 1964   3 Sheets-Sheet 2
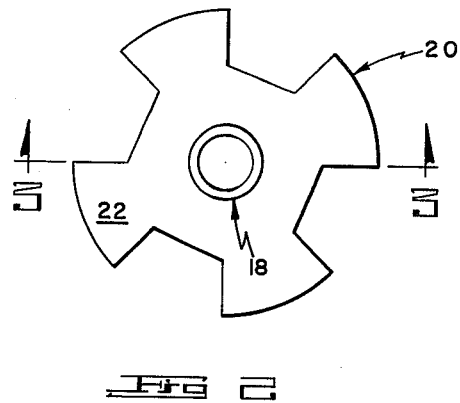
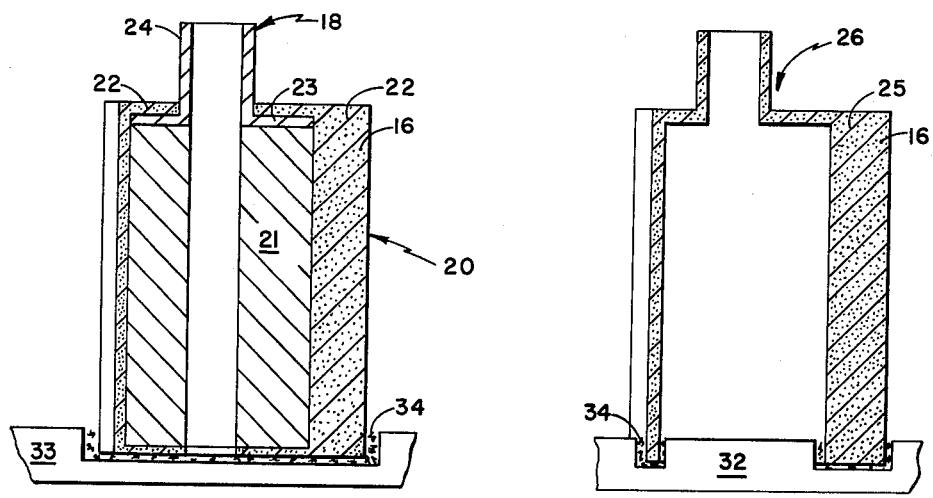
GEORGE M. HERTERICK
JOHN DAVID PETERSON
INVENTORS
BY Alden D Redfield
Abraham Ogman
ATTORNEYS

United States Patent Office 3,244,852
Patented Apr. 5, 1966

3,244,852
PROCESS FOR MAKING ELECTRIC DISCHARGE MACHINING ELECTRODE
George M. Herterick, Waltham, and John David Peterson, Burlington, Mass., assignors to Avco Corporation, Cincinnati, Ohio, a corporation of Delaware
Filed Jan. 6, 1964, Ser. No. 340,845
10 Claims. (Cl. 219—69)

This invention relates to electric discharge machining electrodes and, more particularly, to processes for fabricating electrodes of this type.

This is a continuation in part of the application entitled, "Process for Making Electric Discharge Machining Electrode," Serial No. 211,907, filed July 23, 1962, now abandoned.

Electric discharge machining, hereinafter referred to as E.D.M., is a machining process wherein electric discharges are struck between an electrode and a piece of stock comprising an electrical conductor. The discharges vaporize minute portions of the stock material and erode the material so that it conforms substantially to the shape of the electrode. E.D.M. systems are fairly common.

E.D.M. processing is particularly useful in fabricating tools and dies and machining metals, particularly very hard tool steels, and/or shapes that do not lend themselves to being machined by other conventional methods in a simple and facile manner.

Electrical discharge machining in many instances has cut the cost of machining and fabricating, in a conventional sense, objects having complex contours.

In spite of the advances made by E.D.M. equipment, the over-all operation is still a costly one. The principal item of cost is the fabrication of the E.D.M. electrode. Although it erodes at a substantially slower rate than does the stock being machined, the electrode has a limited life. Depending on the electrode material, a single electrode can machine from two to twenty pieces. For quality-finished machining, the E.D.M. electrode itself is fabricated, at great expense, to close tolerances.

In the past, the life of an E.D.M. electrode has been extended by the use of sintered refractory composite materials such as pressed and sintered tungsten impregnated with copper or any other suitable material normally considered to be a good electrical conductor.

The limitations of pressed and sintered E.D.M. electrodes relate to the high cost of pressing and sintering equipment and the relatively high cost of the sintering process.

Sintering dies require costly materials such as graphite. Typically sintering dies have a short life expectancy, even if inserts are used. Additionally, pressing equipment is quite expensive, particularly in applications where it is desired to press and sinter large pieces in the order of 10–12 inches in diameter and more. Machining of refractory-sintered members is often required to produce electrodes having complicated shapes. Machining of tungsten—the most widely used refractory electrode material—for example, is a difficult procedure.

It is an object of this invention to provide a process for fabricating an E.D.M. electrode which avoids the limitations and disadvantages of prior art processes.

It is another object of the invention to provide a process for fabricating a durable E.D.M. electrode.

It is yet another object of the invention to provide a process whereby an E.D.M. electrode may be fabricated in a simple and facile manner at relatively low cost.

It is yet another object of the invention to provide a process for fabricating E.D.M. electrodes which minimize or eliminate the requirement of machining the electrode to make it conform to a desired contour or shape.

It is still another object of the invention to provide a process for fabricating an E.D.M. electrode which is versatile, allowing for the fabrication of many forms of E.D.M. electrodes.

It is yet another object of the invention to provide a process for fabricating an E.D.M. electrode which utilizes relatively inexpensive fabricating equipment.

Another object of the invention is to provide E.D.M. electrodes which avoid many of the disadvantages and limitations of pressed and sintered electrodes.

Still another object of the invention is to provide E.D.M. electrodes having anisotropic structures and properties.

In accordance with the invention, a process for making an electric discharge machining electrode comprises providing a surface having a desired contour. The above-mentioned surface is spray coated with a refractory material for forming a porous refractory skeleton having an exterior surface conforming to the desired contour. Finally, the porous refractory skeleton is impregnated with a material having a melting point lower than the melting points of the refractory material, the material further being a good conductor of electricity.

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings, in which:

FIGURE 2 is a top view of an electrode fabricated in accordance with the present invention for making an extrusion die.

FIGURE 3 is a cross sectional representation of the FIGURE 2 electrode taken along lines 3—3.

FIGURE 4 is a schematic cross sectional representation of an electrode useful as a trepanning tool being fabricated in accordance with the principles of the present invention.

*General description of the process*

Depositing material by means of spraying molten or plastic particles of material on a surface has been used in the machining trade for some time. Recently, with the advent of arc plasma generating devices, spray-coating processes have been extended to spraying of high refractory materials such as tungsten and tungsten carbide, both of which were very difficult or impossible to spray using chemical oxidation spray processes. The present invention is directed to a process wherein a surface having a desired contour is spray coated with a refractory material, preferably tungsten, to form a porous skeleton having an exterior surface conforming to the desired surface.

The spray-coating step is followed by an impregnating step usually in a reducing atmosphere wherein the porous skeleton is impregnated with a material having a melting point lower than the material from which the porous skeleton is formed. Since the impregnation process depends largely on capillary action, the impregnating material should be such that it wets the surface of the porous skeleton sufficiently so that surface tension draws the impregnating material into the innermost pores of the porous skeleton.

*Specific embodiment of the invention*

Figure 1:
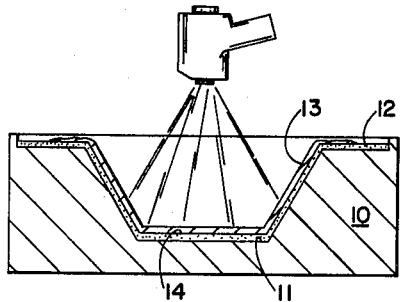
FIGURE 1 is a schematic side view illustrating a portion of a process embodying the principles of the present invention for fabricating an electrode which, in turn, will be used to fabricate a die.

Referring to FIGURE 1 of the drawings, there is depicted a schematic side view which will be used to describe the process embodying the principles of the present invention.

At the outset, a mold 10 having a surface 11 dimensionally contoured to a desired configuration is provided. In contrast to the molds used in prior art processes, particularly pressing and sintering, mold 10 may be fabricated from an inexpensive material such as plastic, plaster or wood. This economy is possible since the mold 10 and the surface 11 are not subject to deterioration by the spraying steps.

The surface 11 is first coated with a parting agent to form a parting coating 12. The function of coating 12 is to facilitate removing the molded refractory skeleton from the mold 10. In the practice of this invention, the parting agent is preferably ordinary salt, sodium chloride.

The parting agent may be applied in any suitable fashion. The preferred procedure, however, is to heat the surface 11 to a temperature above the boiling point of water (100° C.) and to coat the surface 11 with an atomized salt solution. Clearly, upon contacting the heated surface 11 the water evaporates leaving a salt coating forming the parting coating 12. In practice, the depth of the parting coating 12 can be neglected; it is highly exaggerated in FIGURE 1 for clarity.

A coating of metal, preferably a refractory metal such as tungsten, is next sprayed on the parting coating 12 to form a porous skeleton 13. A surface 14 of the porous skeleton 13 conforms to the contour of the desired surface 11.

The spraying equipment used to form the porous skeleton 13 is somewhat dependent on the material chosen. Plasma spraying equipment is preferred since it is capable of depositing a coating of both refractory and nonrefractory substances.

The porous skeleton 13 is parted from the mold by dissolving the salt parting coating 12 in water. Subsequently, the porous skeleton 13 is placed in an oven 15, preferably in a reducing atmosphere—particularly if it is a tungsten skeleton—in contact with an impregnating material 16 (see FIGURE 1A), preferably copper or silver. The temperature of the oven is raised above the melting point of the impregnating material 16 but below the melting point of the skeleton material. The molten impregnating material 16 infiltrates the skeleton pores by capillary action as previously discussed. An excess of impregnating material is provided so that the porous skeleton is seated within a pool of the material, thus assuring substantially complete infiltration.

Copper and silver are particularly useful as impregnating material in fabricating E.D.M. electrodes because both materials are extremely good conductors of electricity and both are good heat transfer mediums. They also exhibit a third characteristic which is particularly useful in this process. Both copper and silver do not alloy substantially with most refractory materials, and tungsten in particular. In spite of their poor alloying properties, they do wet refractory materials, and tungsten in particular, sufficiently to provide excellent capillary action.

When the porous skeleton is fully impregnated, it is cooled and removed from the oven. It may be machined at this time, but if it is to be used to fabricate a die, additional machining of surface 11 is generally not necessary.

Figure 1A:
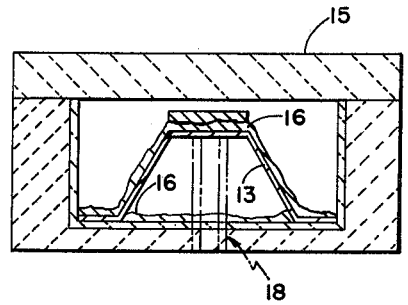
FIGURE 1A is a schematic side view of an impregnating procedure being carried out.

The impregnated skeleton is transferred into an E.D.M. electrode by attaching thereto an electrical conducting means 18, shown in FIGURE 1A in phantom outline, by brazing or any other suitable process. Typically, the electrical conducting means 18 includes a passage 19 for supplying flow of a suitable fluid (not shown) through a concentric hole prepared in the skeleton (not shown) to the arc region between an E.D.M. electrode and the stock to remove particles that are displaced from the stock by the arc discharge.

FIGURE 2 depicts a top view of another form of E.D.M. electrode 20 fabricated in accordance with the principles of the present invention.

FIGURE 3 is a cross section of the FIGURE 2 electrode taken along lines 3—3 and depicting, in addition to the structure of the electrode, the machining procedure.

The electrode 20 is fabricated by spraying the surface of a previously shaped mandril 21 to form a porous skeleton coating 22 on the mandril 21. In this embodiment electrical conducting means 18 comprises a flat washer 23 from which a transverse sleeve 24 extends. It is secured to the mandril 21 by being covered by coating 22. Following the formation of the porous coating 22 the mandril and coating are placed in an oven and impregnated with a suitable material 16 in the manner described heretofore to form a composition E.D.M. electrode. Clearly, in this case the mandril material must have a melting point greater than the melting point of the impregnating material which is usually copper or silver. In this instance steel or soft iron is suggested as a mandril 21 material.

In an alternative, the mandril may be formed from copper and spray coated in the manner described above. The copper mandril supplies the necessary impregnating material 16 with the excess being removed from an impregnated skeleton 25. The result is a homogeneous trepanning device 26 depicted in FIGURE 4.

Figure 5:
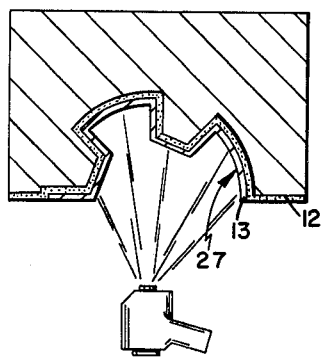
FIGURE 5 illustrates, schematically, steps in a procedure embodying the principles of the present invention for forming a trepanning electrode.
Figure 5A:
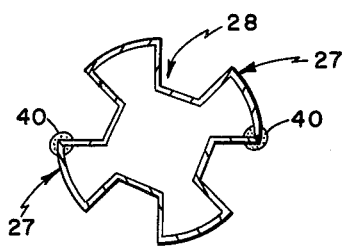
FIGURE 5A illustrates a trepanning electrode constructed from two mating pieces.

A trepanning device may also be fabricated by spray forming two pieces capable of being mated such as two of piece 27 depicted in FIGURE 5. The two pieces are impregnated and brazed together at 40 to form a trepanning electrode 28. See section depicted in FIGURE 5A.

Figure 6:
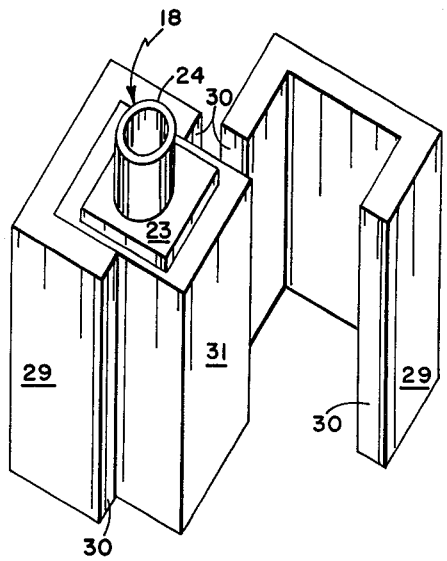
FIGURE 6 illustrates, schematically, an alternate process embodying the principles of the present invention for fabricating an electrode adapted to be used to make an extrusion die.

The embodiment disclosed schematically in FIGURE 6 suggests the formation of an E.D.M. electrode by spraying a refractory material into a mold 29 coated with a parting agent, which can be parted along surface 30. Manifestly, a porous skelton 31, solid except for a removable central core (not shown), results from this particular arrangement and procedure.

The porous skeleton 31 may be transformed into an E.D.M. electrode by impregnating as discussed previously and affixing an electrical conducting means 18 to the skeleton 31.

Electrical conducting means 18 may be secured to the impregnated skeleton by spray coating skeleton material over the washer 23 as shown in FIGURE 3 or by brazing washer 23 to the sprayed skeleton after it has been removed from the mold as depicted in FIGURE 6.

It is quite obvious that the useful life of E.D.M. electrodes depicted in FIGURES 2–6 is a function of their length since the machining action results from electric discharge 34 eroding at the end of the electrode to the stock 33 as shown in FIGURES 3 and 4.

The above-described procedures for fabricating an E.D.M. electrode result in greatly reducing the cost of the manufacturing of these electrodes. In most instances it eliminates entirely the need for repetitive machining of these electrodes. Extensive conventional machining is only required in fabricating the master mold from which the electrodes are formed. It is also significant that wear and tear on the master molds are reduced to a minimum amount and further that they may be fabricated from inexpensive, readily available materials. It is estimated that a five-fold cost reduction is achieved through the practice of this novel spray-forming process.

described herein in comparison with prior art pressing and sintering procedures.

The versatility of the disclosed process is illustrated by another example. A porous skeleton is spray coated on a heated mandril having a heat coefficient of expansion material different from the skeleton. No parting

*Anisotropic E.D.M. electrode structure*

With some mandril materials, copper for example, an agent is required to remove the skeleton from the mandril; it is only necessary to cool the combination down. oxide coating forms at elevated temperatures discouraging the formation of a tenacious bond between the porous skeleton and the mandril.

Figure 7A:
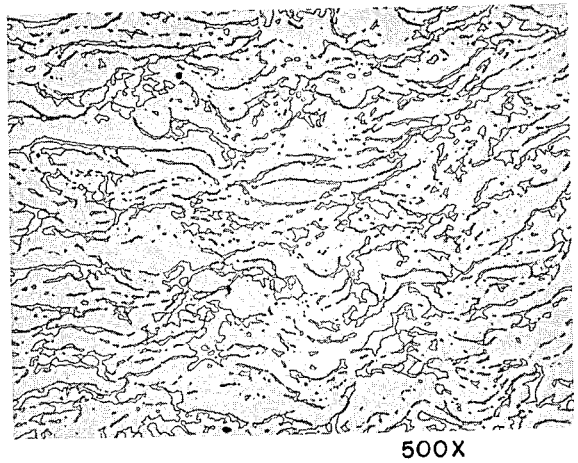
FIGURE 7A is a photomicrograph of a section of sprayed E.D.M. tungsten electrode.
Figure 7B:
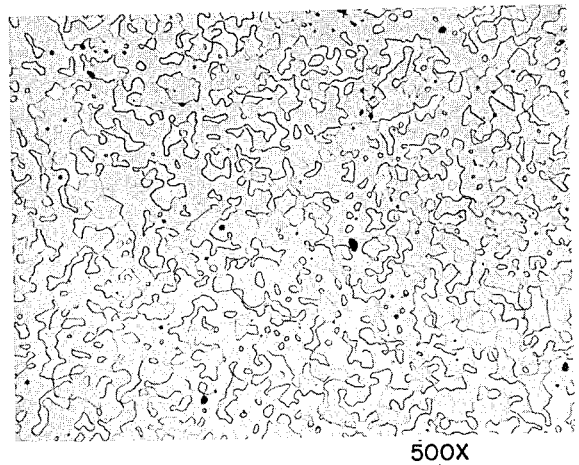
FIGURE 7B is a photomicrograph of a section of a pressed and sintered tungsten structure.

Sprayed E.D.M. electrodes have a distinctive structure in comparison to the prior art pressed sintered electrodes. In cross section, a sprayed E.D.M. electrode exhibits a laminar structure composed of elongated and flattened overlapping particles, the layers running parallel to the surface and substantially perpendicular to the direction of spraying. (See FIGURE 7A.) In contrast, a pressed and sintered section exhibits an isotropic grain structure. (See FIGURE 7B.) Also, whereas skeleton densities of 75–80 percent are the practical maximums that can be practically obtained by pressed and sintered electrodes, densities of sprayed electrodes range from 85–90 percent. High-density billets made by sintering are not possible because closed pores develop between the achieved particles.

The sprayed structure exhibits an open type porosity which makes it possible to fully impregnate the sprayed configuration.

*Anisotropic E.D.M. electrode properties*

Whereas pressed and sintered materials exhibit isotropic properties, sprayed structures do not. Typically, the thermal expansion of pressed and sintered tungsten is $6 \times 10^{-6}$ in any direction, whereas the thermal expansion of sprayed structures is $7.0 \times 10^{-6}$ normal to the layered structure, and $5.4 \times 10^{-6}$ parallel to the layered structure. The foregoing are in inches per inch per degree C.

The wear characteristics of the sprayed structures also differ somewhat depending on the orientation of the layers. Where the principal electrode wear is parallel to the layers, it is slower than where the configuration of the E.D.M. electrode requires the wear to be normal to the layers. The FIGURE 1 E.D.M. electrode illustrates parallel wear.

In either case, sprayed E.D.M. electrodes are more durable probably because of their higher density and open-pored structure assuring complete impregnation.

Perhaps the most significant factor is the greatly reduced cost of manufacturing equivalent E.D.M. electrodes by spraying in comparison with sintering techniques. Another highly significant factor is the ease with which highly complicated shapes can be fabricated. For many configurations, the cost of making sintered electrodes would be economically prohibitive, offsetting the advantages of using electric discharge machining.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

We claim:

1. A process for making an electrical discharge machining electrode comprising the steps of:
   (a) providing a copper mandril including a first surface having a desired shape;
   (b) spray coating said first surface with a tungsten for forming a porous tungsten skeleton having an exterior surface similar in shape to said first surface; and
   (c) raising the temperature of the mandril and said porous tungsten skeleton to a temperature above the melting point of said copper for causing said copper to impregnate said porous tungsten skeleton.

2. A process for making an electrical discharge machining electrode comprising:
   (a) providing a mold having members including surfaces defining an interior passage having a desired shape;
   (b) coating said surfaces with a parting agent;
   (c) spraying tungsten into said passage forming a unitary porous tungsten skeleton having an exterior surface conforming to the shape of said passage;
   (d) securing an electrical conducting means to said porous tungsten skeleton for adapting said porous tungsten skeleton to an electrical discharge machine by placing said electrical conducting means on said porous tungsten skeleton and coating a portion thereof with tungsten; and
   (e) impregnating said porous tungsten skeleton with a molten copper and freezing said impregnant in said porous skeleton.

3. An electrical discharge machining electrode comprising:
   (a) a porous refractory tungsten skeleton characterized by an anisotropic structure composed of elongated and flattened overlapping particles and open pores, produced by spray coating; and
   (b) copper impregnant in said pores.

4. An electrical discharge machining electrode as described in claim 3 in which the density of said porous tungsten skeleton exceeds 80 percent.

5. An electrical discharge machining electrode as described in claim 3 in which the density of said tungsten exceeds 80 percent.

6. An electrical discharge machining electrode as described in claim 3 in which said flattened overlapping particles are oriented perpendicularly to the direction of the principal anticipated wear.

7. A process for making an electrical discharge machining electrode comprising the steps of:
   (a) providing a surface having a desired contour;
   (b) spray coating said surface with tungsten to form a porous tungsten skeleton having an exterior surface conforming to the desired contour;
   (c) impregnating said porous tungsten skeleton with molten copper and freezing said copper in said porous skeleton; and
   (d) attaching electrical conducting means to said tungsten skeleton for securing and adapting said tungsten skeleton to an electrical discharge machine.

8. A process as described in claim 7 wherein said electrical conducting means is secured to said tungsten skeleton by a spray coated bond.

9. A process as described in claim 7 wherein said spray coating is applied parallel to the direction of anticipated principal wear.

10. A process for making an electrical discharge machining electrode comprising the steps of:
    (a) providing a mandril including a first surface having a desired shape;
    (b) spray coating said first surface with a refractory metal for forming a porous refractory skeleton having an exterior surface similar in shape to said first surface, said coating being applied parallel to the direction of anticipated principal wear; and
    (c) raising the temperature of the mandril and said porous refractory skeleton to a temperature above the melting point of said mandril material for causing said mandril material to impregnate said porous refractory skeleton.

(References on following page)

References Cited by the Examiner

UNITED STATES PATENTS

| | | | |
|---|---|---|---|
| 1,423,914 | 7/1922 | Churchward | 219—145 |
| 2,281,634 | 5/1942 | Stossel | 22—200 |
| 2,733,161 | 1/1956 | Lytton et al. | 117—22 |
| 2,737,456 | 3/1956 | Haller | 22—196 X |
| 2,861,164 | 11/1958 | Stegler | 219—69 |
| 2,909,641 | 10/1959 | Kucyn | 219—69 |
| 3,016,447 | 1/1962 | Gage et al. | 219—76 |
| 3,035,151 | 5/1962 | Weglarz | 219—69 |

RICHARD M. WOOD, *Primary Examiner.*

R. F. STAUBLY, *Assistant Examiner.*